United States Patent [19]

Gährs

[11] Patent Number: 4,714,617

[45] Date of Patent: Dec. 22, 1987

[54] PROCEDURE FOR SEGREGATION OF MIXTURE OF SUBSTANCES CONTAINING ORGANIC COMPONENTS

[75] Inventor: Hans J. Gährs, Dusseldorf, Fed. Rep. of Germany

[73] Assignee: Messer Griesheim GmbH, Fed. Rep. of Germany

[21] Appl. No.: 845,474

[22] Filed: Mar. 27, 1986

Related U.S. Application Data

[63] Continuation of Ser. No. 644,040, Aug. 24, 1984, abandoned.

[30] Foreign Application Priority Data

Sep. 3, 1983 [DE] Fed. Rep. of Germany ....... 3331906

[51] Int. Cl.$^4$ .................... A24B 15/24; A23F 5/20
[52] U.S. Cl. .................... 426/427; 426/428; 426/422; 426/478; 426/479; 131/297; 203/49
[58] Field of Search .............. 203/49; 426/427, 428, 426/422, 478, 479; 131/297

[56] References Cited

U.S. PATENT DOCUMENTS

| 4,153,063 | 5/1979 | Roseluis et al. | 131/297 |
| 4,167,589 | 9/1979 | Vitzhum et al. | 426/427 X |
| 4,251,559 | 2/1981 | Margolis et al. | 426/427 X |
| 4,255,458 | 3/1981 | Roseluis et al. | 426/427 X |
| 4,322,445 | 3/1982 | Peter et al. | 426/427 X |
| 4,341,804 | 7/1982 | Prasad | 426/427 X |
| 4,348,422 | 9/1982 | Zosel | 426/427 X |
| 4,364,965 | 12/1982 | van der Stegen | 426/427 X |
| 4,411,923 | 10/1983 | Hubert et al. | 426/427 X |
| 4,437,938 | 3/1984 | Bhise et al. | 203/49 X |
| 4,437,939 | 11/1981 | Bhise et al. | 203/49 X |
| 4,472,442 | 9/1984 | Katz | 426/427 X |
| 4,561,452 | 12/1985 | Gahrs | 131/297 |

Primary Examiner—Joseph Golian
Attorney, Agent, or Firm—Connolly & Hutz

[57] ABSTRACT

Mixtures of substances containing organic components are segregated by extraction with a gaseous solvent in high pressure extraction. One additive component is admixed to the charged solvent, whereby the solvent capacity of the solvent is strongly reduced and consequently a precipitation is achieved for at least a portion of the components to be captured as an extract.

12 Claims, 3 Drawing Figures

PROCEDURE FOR SEGREGATION OF MIXTURE OF SUBSTANCES CONTAINING ORGANIC COMPONENTS

CROSS-REFERENCE TO RELATED APPLICATION

This application is a continuation of application Ser. No. 644,040, filed Aug. 24, 1984, now abandoned.

BACKGROUND OF THE INVENTION

The invention concerns a procedure to separate mixtures containing organic components, by means of high pressure extraction.

It is known that numerous gases have a high solvent capacity, even for heavy substances, if they are used as solvents under high pressures. Preferably, the gases are used under super critical conditions in respect to pressure and temperature. It is a specific advantage of high pressure extraction that the characteristics of the solvent used, e.g., solvent capability and selectivity, can be varied by simple changes of pressure and temperature. Many procedures have been developed which utilize these characteristics, e.g., as known from DE-AS No. 14 93 190, DE-PS No. 20 05 293, DE-OS No. 21 06 133, DE-OS No. 21 27 596, DE-PS No. 21 27 642, DE-OS No. 22 12 281 and DE-OS No. 26 37 197.

From DE-OS No. 27 37 793, it is further known how to use a multi-component gas as a solvent. Hereby a so-called carrier is added to the actual gas serving as a solvent, whereby the solubility of specific substances is significantly increased.

In principle, the installations for implementing the high pressure extraction procedure consist of an extractor and a separator. In the extractor, the solvent flows through the mixture and thereby dissolves certain substances contained in it. These are segregated from the solvent as far as possible in the connected separator. Since the quantity of contained substances transported into the separator per unit solvent is generally small, large quantities of solvent must flow through the extractor in order to achieve satisfactory levels of extraction. For economical reasons, it is therefore necessary to return the solvent from the separator into the extractor for re-use, after it has been freed from the contained substances to the greatest extent possible, and to maintain this circulation until the desired level of extraction has been reached.

There are numerous variations of the basic principle of this procedure. One may mention, e.g., fractionated extraction or extract recovery. Hereby, several extractors and separators are used under varying pressure and temperature conditions, and/or the procedure is carried out in sequential steps under these conditions. However, the described basic principle applies for all of these levels of the procedure.

The segregation of the dissolved contained substances from the solvent is of utmost importance for the economy of the high pressure extraction procedure. Unsatisfactory segregation has a negative influence on the economy of the procedure and limits the charge capacity of the solvent for continued extraction. The segregation in the separator is carried out either by means of pressure and temperature changes, or by using different separator fillers, which function, e.g., according to the principles of adsorption, gas scrubbing, or ion exchange.

Some of these segregation procedures have significant disadvantages. In order to achieve far-reaching segregation of the dissolved substances by means of pressure and temperature changes, there will mostly have to exist great pressure and temperature differences between the extractor and the separator. On one hand, this means that the process becomes significantly more expensive, and on the other hand, there is often such a strong thermal load on the extract that the quality and usefulness thereof is limited. In principle, isobaric or isothermic segregation by means of adsorbents, ion exchangers, or scrubbing solutions is thus more advantageous. In this procedure, the main disadvantage is that the extract must be repeatedly recaptured from the separator stage in subsequent steps of the process. This is technically costly and uneconomical; occasionally it is even impossible. Thus, for instance, in large scale application of high pressure extraction for decaffeinating raw coffee, the extracted caffeine is adsorbed on active carbon without being recovered and utilized further.

SUMMARY OF INVENTION

An object of the invention is to create a procedure for high pressure extraction, whereby the segregation of the extracted contained substances can be achieved more economically than before, with low technical cost, and particularly without thermal load on the extract.

When temperature and/or pressure changes are required for extensive segregation of the dissolved contained substances in spite of the admixture of an additive according to the invention, these are significantly smaller than during segregation without additives. Consequently, the thermal load on the extract is at least significantly decreased, the technically costly use of adsorbents, ion exchangers or scrubbing solutions is completely eliminated.

The procedure according to the invention is oriented exclusively towards improvement of the extract segregation during high pressure extraction. The progress of the procedure in the extractor is not affected. The invention can thus be applied in all known high pressure extraction procedures, i.e., for all solvents or mixtures of solvents, for working in the undercritical or supercritical ranges, and for both simple extraction and fractionated extraction with extractors and separators coupled parallel or in series.

All gases which can also be used as solvents may be considered for use as additives. The gates commonly used for this purpose are $CO_2$, $N_2O$, $NH_3$, $H_2O$, $N_2$, Ar or organic gases such as methane, ethane, propane or their derivatives such as methanol and toluene, or chlorinated or fluorinated hydrocarbons. However, in most cases, inorganic gases are to be preferred as additives, particularly $N_2$ or Ar. Naturally, related mixtures of additives can also be considered.

The admixture of the additives may be undertaken in a mixing stage prior to the segregation stage, but also in integrated mixing stage in the separator. This means that in the latter case, the separator is developed for a combined mixing and segregation stage. In respect to design, the mixing stage can be held simple and e.g., consist merely of a nozzle for the additives and a mixing distance. However, more costly mixing techniques may also be applied.

As in the case of extraction, it may also be advisable to work with several mixture/segregation stages in the separation; these may then be arranged parallel or in series. Hereby the same or differently composed additive components can be used. Should any pressure or temperature changes still be required for optimization of the extraction procedure in question, these may be carried out after each one of the process stages of extraction, mixing, segregation and solvent preparation.

Since under any circumstances economy dictates that the solvent must be re-used for extraction after it has been freed of the extract, the mixture of solvent and additives must again be segregated in a preparation stage. If additive mixtures are used, several preparation stages may be required. As a rule, it is advantageous if not only the solvent but also the additives are re-used as per the procedure according to the invention. However, this is not absolutely necessary. All suitable and known procedures can be used for segregating the mixture of solvent and additives. The selection is primarily determined by the nature of the mixture and the operational conditions. For example, the segregation can be carried out by means of membranes, adsorbing materials or scrubbing solutions. In addition, there are also catalytic or thermal combustion procedures, as well as reduction of certain portions of the mixture. Further, parts of the mixture can be segregated by means of condensation. For instance, according to their composition, the $N_2/CO_2$ mixtures, which are appropriate for many applications, can be more advantagesously segregated by means of adsorption or by means of membranes, possibly also by means of a combination of adsorption and membranes. $CO_2$ is more easily bonded to almost all adsorber materials than is $N_2$. If the $CO_2$ content in this mixture is small, the adsorption technology is thus to be preferred.

In many cases one will abstain from a complete segregation for economical reasons and instead replace the non-segregated portions with fresh solvent and fresh additives. This is a question of economical optimization, which must be resolved from case to case.

It is an important advantage of the procedure according to the invention that both the residue and the extract can be re-used. Particularly in the case of isobaric and isothermic operation, i.e., without significant pressure and temperature differences between the extractor and the separator, the extract will be pure and not e.g., attached to adsorber material or diluted, as e.g., in scrubbing solutions.

An additional advantage of the procedure according to the invention is that the admixture of the additive makes recapturing of the extract more economical, since even if certain pressure and temperature changes must be made between extraction and segregation in order to optimize the extraction process, these are significantly smaller than without the use of additives according to the invention. The preparation and regeneration of the mixture of solvent and additives can be carried out according to different procedures as best adjusted to the compositions in question. With both membrane technology and adsorption technology, particularly pressure change adsorption, good segregation results can be obtained for the compositions considered with significantly lesser pressure differences than required hitherto common methods for separation of solvent and extracts.

The advantages of the procedure according to the invention can be demonstrated with reference to decaffeinating of raw coffee and denicotinization of tobacco.

Caffeine can easily be dissolved from raw, moistened coffee beans with moist $CO_2$ under high pressures of approximately 300 bar and at temperatures of approximately 80° C. However the segregation of the dissolved caffeine is difficult. At 80° C. and 300 bar, the caffeine solubility in $CO_2$ amounts to approximately 4 mg/g at 80° C. and 250 bar barely 1 mg/g, and not until 80° C. and 160 bar is a solubility of approximately 0.1 mg/g achieved. A satisfactory segregation of caffeine by pressure drop alone thus requires a pressure difference of more than 100 bar between the extractor and the separator. Isobaric segregation is practically not to be considered, since at a temperature of 38° C. the solubility of caffeine is still approximately 2 mg/g at 300 bars.

If e.g., $N_2$ is admixed as additive to the charged $CO_2$ after the extractor, the solubility of the mixture of solvent and additive falls drastically. With a 5% proportion of $N_2$ in the mixture, it sinks to approximately 80% with 10% $N_2$ to approximately 40% and with 25% $N_2$ to approximately 10% of the value for pure $CO_2$. These indications relate to 300 bar and 80° C. By means of admixture according to the invention of $N_2$ as additive to the charged solvent $CO_2$, a far-reaching segregation of the extract is thus achieved with isobaric and isothermic operation.

The separation of the mixture of $CO_2$ and $N_2$ after segregation of the caffeine can be achieved, e.g., with specific solubility membranes which have a permeability coefficient of approximately 4,250 kgm/Ns for $CO_2$ and of approximately 235 kgm/Ns for $N_2$.

The procedure according to the invention can also be advantageously applied for the denicotinization of tobacco. At approximately 150 bar and 50° C., $CO_2$ has a good, practically optimal solvent capacity for nicotine and can take up approximately 80 mg/g. If, according to the invention, 25% $N_2$ are admixed to the charged $CO_2$, this will cause a drastic decrease of the solubility to approximately 2.5% of the value for pure $CO_2$. This effect can also be obtained by admixture of 10 % Ar. The solubility values for the $N_2/CO_2$ and $Ar/CO_2$ mixtures are also related to 150 bar and 50° C.

In the segregation of oils from natural substances, organic gases are often better solvents than $CO_2$. Here as well, the solvent capacity can be drastically reduced by admixing an additive, particularly $N_2$, according to the invention.

The Drawings

Detailed Description

Figure 1:
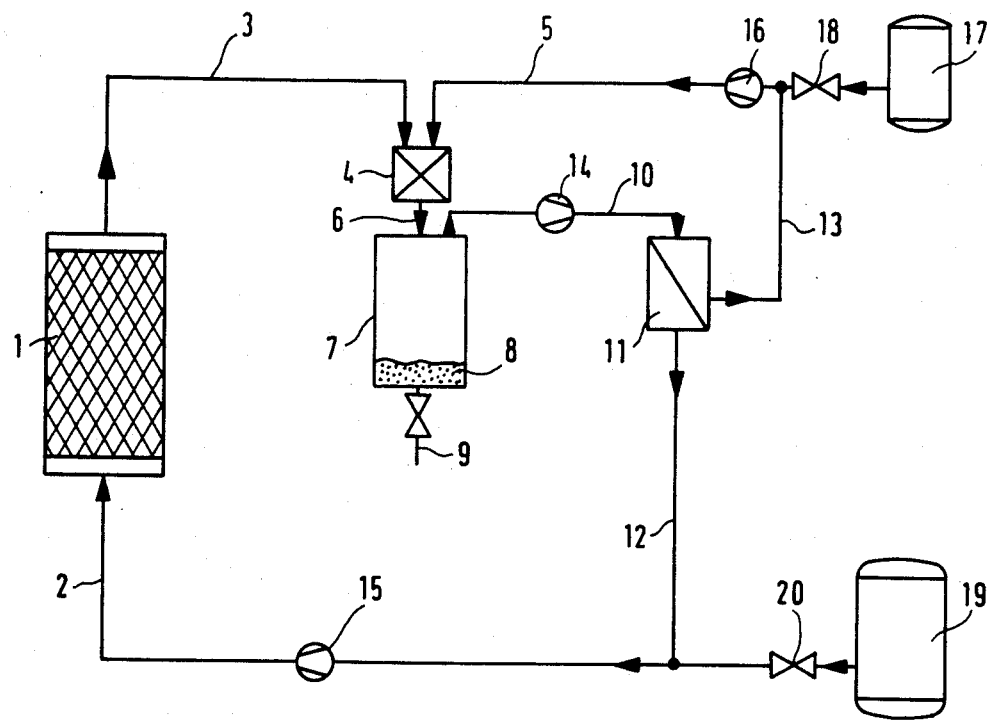
FIG. 1 is a flow diagram of a single stage pressure extraction.

The flow diagram shown in FIG. 1 can be applied, e.g., to the previously described decaffeination of raw coffee or denicotinization of tobacco. The substance mixture to be extracted is located in the extractor 1. Through line 2, the solvent flows into the extractor 1 under desired pressure and temperature conditions. In the extractor 1, it is charged with the contained substance to be extracted, and it leaves the extractor 1 through the line 3. According to the invention, an additive component is admixed to the charged solvent in a mixing device 4 which component arrives into the mixing device 4 through the line 5. The mixture of charged solvent and additive component enters the separator 7 through the line 6. Due to the drastic decrease of the solubility by means of the admixture of the additive component according to the invention, the previously dissolved contained substances precipitate in the separator 7 as extract 8 and can be removed through the line 9. The mixture of solvent and additive component from which the dissolved contained substances have been extensively removed then arrives into the preparation stage 11 through line 10. Here the mixture is again separated into its components, and the individual partial flows are returned to the applicable process stages. From the preparation stage 11, the solvent returns to the extractor through lines 12 and 2; the additive component flows through lines 13 and 5 back into the mixing device 4. Pressure drops in the system are equalized by means of pumps 14, 15 and 16. At the beginning of the process when the stop valves 18 and 20 are open, the installation is filled from the storage container 17 for the additive component and the storage container 19 for the solvent. If required, there can be a supplementation from the storage containers during the process as well.

Figure 2:
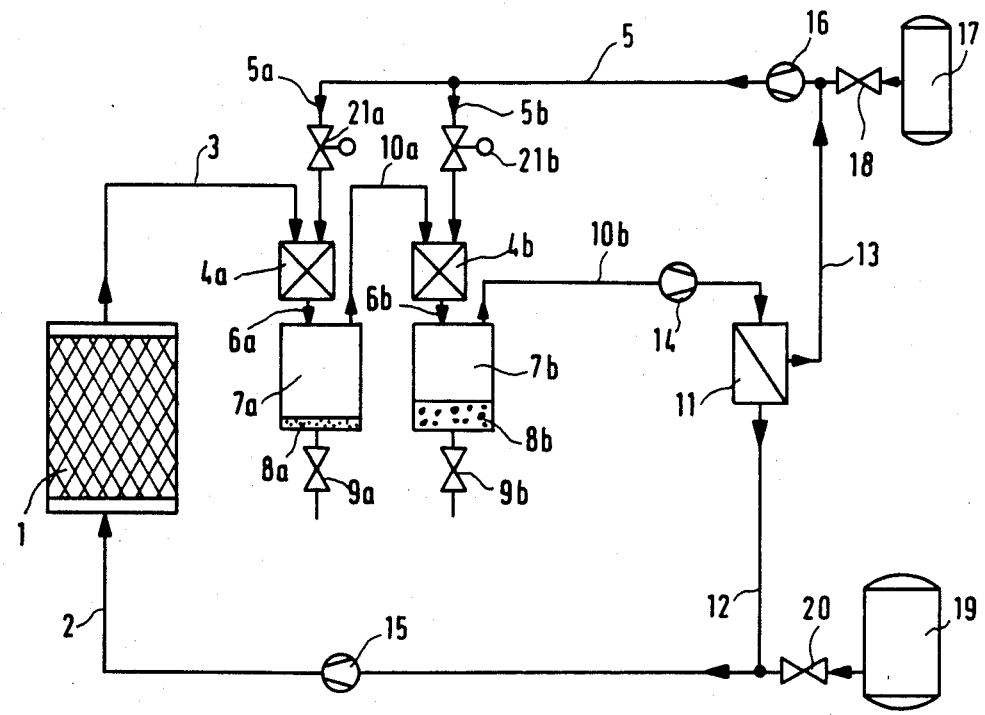
FIG. 2 is a flow diagram of pressure extraction with two-stage segregation and an additive component of the same composition.

FIG. 2 shows the flow diagram of a pressure extraction with two-stage segregation and an additive of the same composition. For similar parts of the installation, the position numbers from FIG. 1 have been retained. Two separators are used, 7a, 7b with precoupled mixing devices 4a, 4b. The charged solvent from the extractor 1 arrives through line 3 into the first mixing device 4a where, according to the invention, an additive component is admixed via line 5a and control valve 21a. Through line 6a the mixture arrives into the separator 7a where dissolved contained substances precipitate as extract 8a and can be removed through line 9a. The mixture of solvent, not precipitated contained substances, and additive component which leaves the separator 7a through line 10a is subsequently led into a connected mixing device 4b where more of the additive component is admixed through line 5b and control valve 21b. This reduces the solubility further. A second extract fraction 8b precipitates from the mixture which enters the separator 7b through line 6b and can be removed through line 9b. The mixture of solvent and additive component arrives into the preparation stage 11 through line 10b. The continued process corresponds to that related to FIG. 1.

Figure 3:
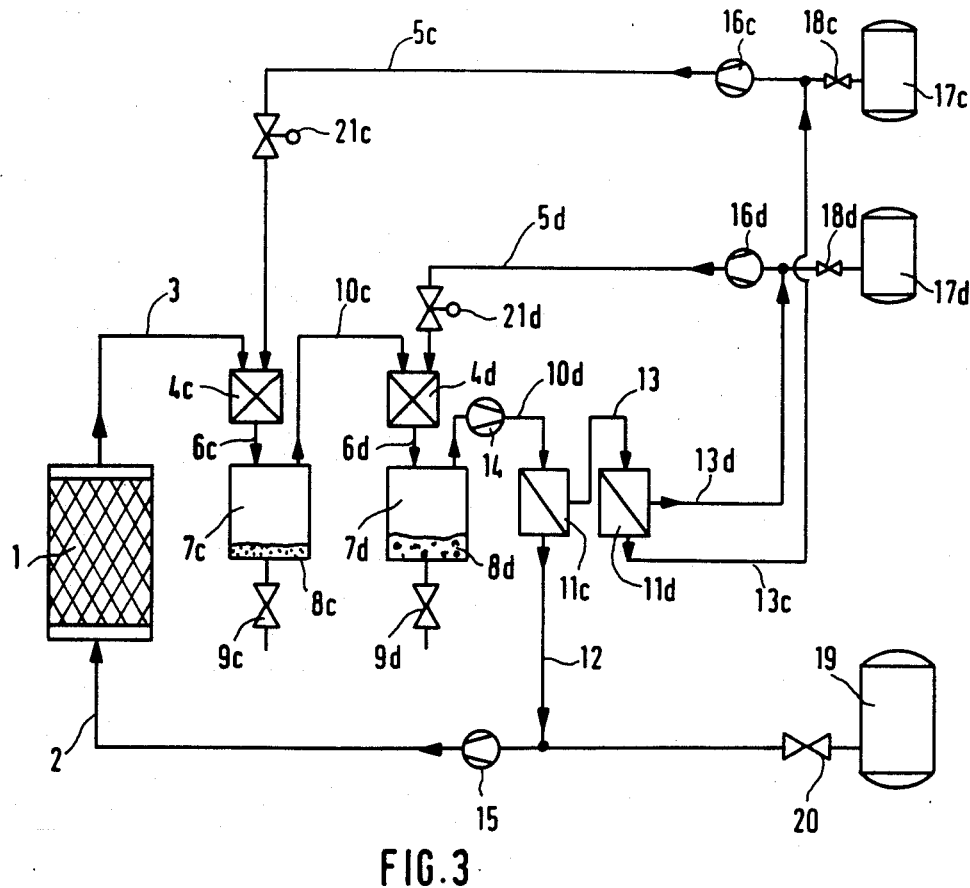
FIG. 3 is a flow diagram for pressure extraction with two-stage segregation and two additive components of different composition.

FIG. 3 shows a pressure extraction with two-stage segregation, whereby two additive components of different composition are used. For similar parts of the installation, the positions from FIG. 1 are still retained. As in FIG. 2, mixing device 4c, line 6c, separator 7c, line 10c, mixing device 4d, line 6d and separator 7d are coupled in series. However, additive components with different compositions are used. One arrives from storage container 17c through stop valve 18c, pump 16c, line 5c and control valve 21c into the mixing device 4c. Correspondingly the other additive component arrives from storage container 17d through stop valve 18d, pump 16d, line 5d and control valve 21d into the mixing device 4d. Accordingly, different extracts 8c and 8d are captured which can be removed through lines 9c and 9d. The mixture of solvent and additive components is removed from the separator 7d through line 10d. In the series coupled preparation stages 11c and 11d, the solvent is first segregated in preparation stage 11c and returned through line 12 into the extractor 1. Subsequently the mixture of the additive components is segregated in preparation stage 11d and returned to the corresponding mixing devices via lines 13c, 13d and pumps 16c, 16d.

Summary

In high pressure extraction gases under high pressure are used preferably under super-critical conditions, namely as solvents for mixtures of substances containing organic components. The dissolved components are subsequently separated, and the solvent 2 is reused for extraction 1. The segregation can be effected in the separator with application of great pressure and temperature differences, or by means of adsorption and scrubbing procedures. These procedures are technically costly, and in some instances they affect the quality of the extract in a negative manner.

In order to increase the cost efficiency of the segregation and to ascertain the quality of the extract 8, the segregation is effected by admixing an additive component 5 to the charged solvent 3. The additive component is selected from the group of gases commonly used as solvents. If significantly reduces the solvent capacity of the solvent and thereby causes a precipitation of at least part of the extract to be captured.

What is claimed is:

1. In a procedure for decaffeinating raw coffee by high pressure extraction wherein a gaseous solvent is charged into the coffee in an extractor under high pressure conditions to dissolve the caffeine of the coffee, the mixture of solvent and coffee components then being conveyed to a separator in a separation stage from which the coffee components are extracted and removed and with the solvent being conveyed from the separator for reuse in a further extraction procedure, the improvement being in the solvent being selected from the group consisting of $CO_2$, $N_2$ and mixtures thereof, admixing at least one additive selected from the group consisting of $CO_2$, $N_2$ and Ar to the charged solvent immediately before or directly into the separation stage, the additive reducing the solvent capacity of the solvent and functioning to facilitate the achievement of a precipitation in the separator for at least a portion for the components to be extracted, the additive containing at least one material different from the solvent to permit the later separation of the additive from the solvent, segregating the mixture of solvent/additive from which the precipitated components have been removed into solvent and additive components in a preparation stage, thereafter again adding the solvent to the mixture of substances for purposes of continued extraction, and again admixing the additive components to the charged solvent by conveying the additive components in a circuit which does not include the extractor.

2. Procedure according to claim 1, characterized thereby that additive components are admixed in several mixing and segregation stages coupled in series, in order to affect a fractionated segregation of various extracts.

3. Procedure according to claim 1, characterized thereby that the segregation of the extract is carried out with pressures and temperatures which are different from those of the extraction conditions.

4. Procedure according to claim 1, characterized thereby that the segregation of solvent and additive components takes place in the preparation stage by means of adsorption and/or membranes.

5. Procedure according to claim 1, characterized thereby that the additive is nitrogen and the solvent is $CO_2$.

6. Procedure according to claim 1, characterized thereby that the additive is selected from the group consisting of nitrogen and argon and the solvent is $CO_2$.

7. In a procedure for the denicotinization of tobacco by high pressure extraction wherein a gaseous solvent is charged into the tobacco in an extractor under high pressure conditions to dissolve the nicotine of the tobacco, the mixture of solvent and tobacco components then being conveyed to a separator in a separation stage from which the tobacco components are extracted and removed and with the solvent being conveyed from the separator for reuse in a further extraction procedure, the improvement being in the solvent being selected from the group consisting of $CO_2$, $N_2$ and mixtures thereof, admixing at least one additive selected from the group consisting of $CO_2$, $N_2$ and Ar to the charged solvent immediately before or directly into the separation stage, the additive reducing the solvent capacity of the solvent and functioning to facilitate the achievement of a precipitation in the separator for at least a portion of the components to be extracted, the additive containing at least one material different from the solvent to permit the later separation of the additive from the solvent, segregating the mixture of solvent/additive from which the precipitated components have been removed into solvent and additive components in a preparation stage, thereafter again adding the solvent to the mixture of substances for purposes of continued extraction, and again admixing the additive components to the charged solvent by conveying the additive components in a circuit which does not include the extractor.

8. Procedure according to claim 7, characterized thereby that additive components are admixed in several mixing and segregation stages coupled in series, in order to affect a fractionated segregation of various extracts.

9. Procedure according to claim 8, characterized thereby that different additive components are admixed.

10. Procedure according to claim 9, characterized thereby that the segregation of the extract is carried out with pressures and temperatures which are different from those of the extraction conditions.

11. Procedure according to claim 10, characterized thereby that the segregation of solvent and additive components takes place in the preparation stage by means of adsorption and/or membranes.

12. Procedure according to claim 7, characterized thereby that the additive is selected from the group consisting of nitrogen and argon and the solvent is $CO_2$.

* * * * *